(12) United States Patent
Clark

(10) Patent No.: US 7,508,567 B1
(45) Date of Patent: Mar. 24, 2009

(54) METAL ETALON WITH ENHANCING STACK

(75) Inventor: Stephan R. Clark, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/971,106

(22) Filed: Jan. 8, 2008

(51) Int. Cl.
*G02F 1/03* (2006.01)
*G02B 1/10* (2006.01)
*B32B 15/04* (2006.01)
*G01B 9/02* (2006.01)

(52) U.S. Cl. .................. 359/260; 359/583; 359/584; 359/585; 359/586; 428/457; 428/213; 356/519

(58) Field of Classification Search ............... 359/260, 359/580, 583–586, 589, 590, 581, 577, 360, 359/364, 392, 629, 720, 726; 356/345, 352, 356/519; 385/12–15, 37; 428/30, 34, 38, 428/213, 432, 437, 461, 463, 457, 458, 487, 428/488, 39, 45, 79, 482; 40/594; 73/24.02, 73/24.06; 525/326.3
See application file for complete search history.

(56) References Cited

U.S. PATENT DOCUMENTS

| | | | | |
|---|---|---|---|---|
| 2,392,978 A | * | 1/1946 | Dimmick .................... 359/583 |
| 2,519,545 A | * | 8/1950 | Colbert et al. ............... 359/584 |
| 2,651,128 A | * | 9/1953 | Burdick ....................... 40/594 |
| 3,011,383 A | * | 12/1961 | Sylvester et al. ............. 359/584 |
| 3,537,944 A | * | 11/1970 | Berning et al. ................ 428/34 |
| 4,965,121 A | * | 10/1990 | Young et al. ................. 428/213 |
| 5,886,249 A | * | 3/1999 | Bonne et al. ................ 73/24.02 |
| 5,889,590 A | * | 3/1999 | Duggal et al. ................ 356/519 |
| 6,426,830 B1 | | 7/2002 | Robinson |
| 6,898,338 B2 | * | 5/2005 | Kersey et al. .................. 385/13 |
| 6,912,346 B2 | | 6/2005 | Gonthier et al. |
| 6,929,864 B2 | * | 8/2005 | Fleming et al. ............. 428/457 |
| 6,963,381 B2 | | 11/2005 | Kano et al. |
| 7,027,469 B2 | | 4/2006 | Sidorin et al. |
| 7,267,781 B2 | | 9/2007 | Steinberg et al. |
| 2007/0224814 A1 | | 9/2007 | Le et al. |

FOREIGN PATENT DOCUMENTS

JP          04-350601       12/1992
WO         WO-9948827        9/1999

\* cited by examiner

*Primary Examiner*—Loha Ben

(57) ABSTRACT

A device includes a pair of two partially transmitting optical surfaces positioned approximately parallel to each other and spaced apart. A high reflectance metal etalon coating is formed on each of the optical surfaces. An enhancing stack is coupled to the metal etalon coating on each of the optical surfaces.

20 Claims, 3 Drawing Sheets

METAL ETALON WITH ENHANCING STACK

BACKGROUND

An etalon optical filter is essentially an optical cavity made of two partially transmitting optical surfaces that are approximately parallel to each other. The filter works by a principle of multiple beam interference. Various bounces of light off the optical surfaces add together to give a final transmitted or reflected beam. The net transmission or reflection is a function of wavelength and depends on the material properties used in coatings of the optical surfaces and the separation distance of the two optical surfaces.

If the two surfaces of the etalon have a high reflectance, then the bandpass of the filter will be narrow and referred to as having a high finesse. If the reflectance is low, then the etalon will allow a wider bandpass, or have a low finesse.

Metal coatings have been used in etalons and can be made to provide a fairly uniform response as a function of wavelength. However, a metal coating may not have a high reflectance unless it is very thick. Thick metal coatings also tend to absorb light, leading to a low net transmission.

In other prior devices, a separately generated dielectric coated etalon may be bonded onto a MOEMS (micro optical electrical mechanical system) device so that etch and deposition steps may be done on the MOEMS device separately. This may add steps to the fabrication of the device and result in difficult alignment and bonding of the etalon to separate filters on the original device. Increased cost and reduced yield may result.

DETAILED DESCRIPTION

Figure 1:
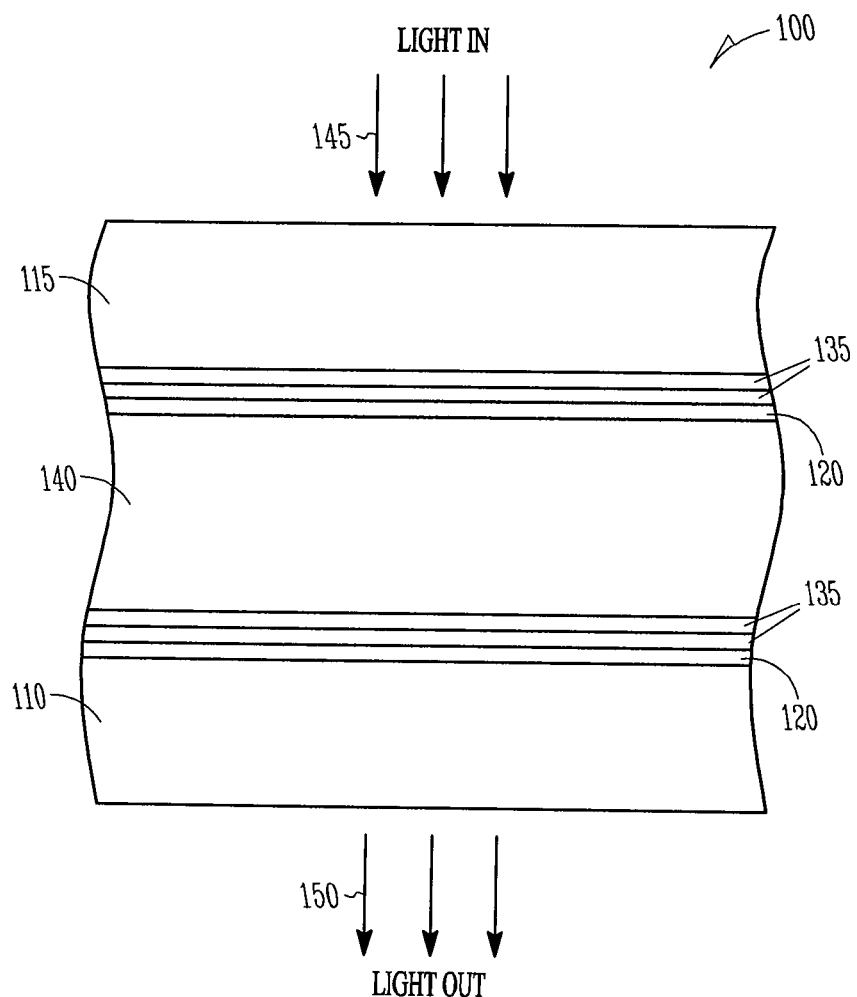
FIG. 1 is a block cross section of an etalon according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

An etalon or Fabry-Perot interferometer device 100 is formed with a pair of two partially transmitting optical surfaces 110, 115 positioned approximately parallel to each other and spaced apart. A high reflectance metal etalon layer or coating 120 is formed proximate each of the optical surfaces. An enhancing stack 135 is coupled to the metal etalon coating on each of the optical surfaces.

In one embodiment, the enhancing stack 135 is formed of silicon nitride and silicon dioxide. The enhancing stack 135 may be formed with a first material that has a relatively high index of refraction and a second material with a relatively low index of refraction, such as indices corresponding to silicon dioxide and silicon nitride respectively.

In one embodiment, the metal etalon coatings comprise aluminum. During manufacture, aluminum oxide may form on the aluminum before further layers, such as enhancing stack 135, are formed.

In one embodiment, a spacing layer 140 is formed between the pair of optical surfaces and coatings. The spacing layer may be silicon dioxide in one embodiment, and defines a distance between the pair of optical surfaces that affects properties of the etalon, such as the free spectral range of the etalon.

The optical surfaces 110, 115 may be formed of silicon dioxide or other material if desired. The optical surfaces are transmissive, allowing light in as represented at arrows 145 and light out as represented by arrows 150 of the device 100. Light entering the device 110 at 145 bounces off the optical surfaces 110, 115 such that light waves add together to give a final transmitted beam 150. In some embodiments, the light may be reflected back out in the same direction as which it entered. An additional reflector may be added on optical surface 110 to provide suitable reflection of the light.

Device 110 may be formed using common deposition and etching steps. Device 110 may also be supported by a substrate. The term supported is used to indicate that one or more layers may be formed on the substrate prior to formation of layers identified as being supported by the substrate. The substrate may be silicon or other material suitable for allowing formation of the layers described herein.

Figure 2:
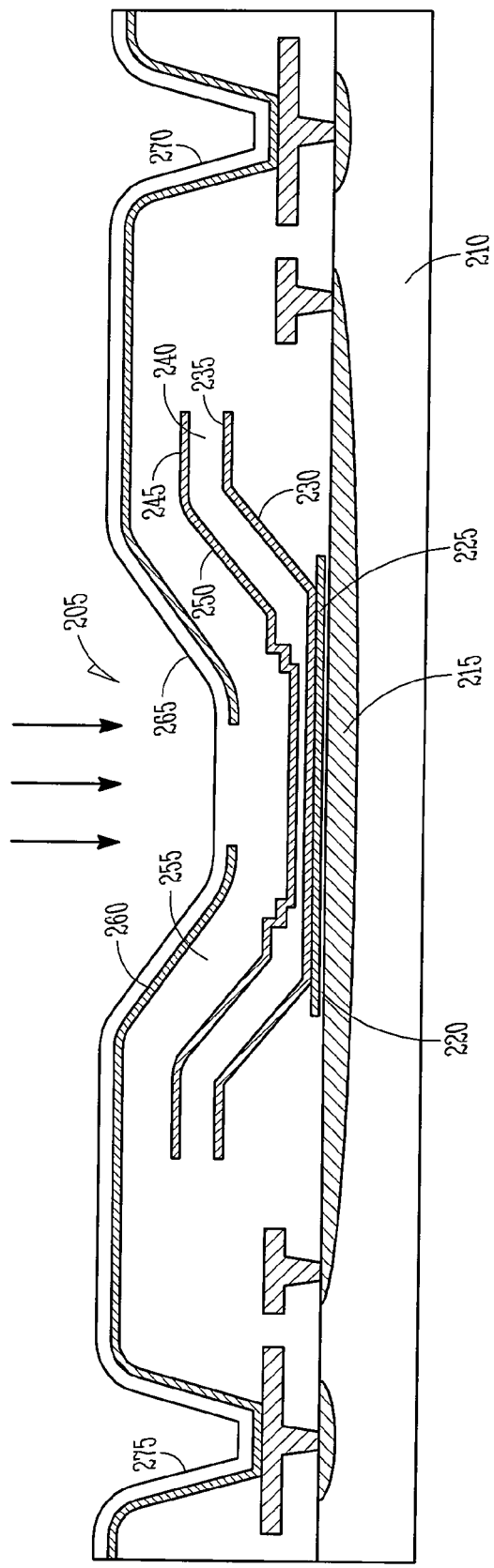
FIG. 2 is a block cross section of color sensor including an etalon according to an example embodiment.

FIG. 2 is a block cross section diagram of an etalon indicated generally at 205 supported by a substrate 210 that also supports a light sensor such as photodiode 215. Following formation of a common photodiode 215 supported by substrate 210, a first layer of silicon dioxide 220 is formed. In one embodiment, the silicon dioxide layer 220 is approximately 10 nm thick and serves as an optical surface. A silicon nitride layer 225 is then formed supported by the substrate 210 and the silicon dioxide 220. Silicon nitride layer 225 may be approximately 87 nm thick in one embodiment, and may be a layer left over from forming different elements on substrate 210. In one embodiment, the silicon dioxide layer 220 and silicon nitride layer 225 may be used to enhance a blue region of net light transmission in etalon 205.

A layer of aluminum 230 is then formed to provide a first reflective layer of the etalon 205. The aluminum layer 230 is approximately 10 nm thick in one embodiment, and a thin layer of aluminum oxide, $Al_2O_3$ of approximately 3 nm may form from exposure of the aluminum layer 230 to oxygen. It is represented by the same reference number 230 for simplicity. Aluminum layer 230 provides a high reflectance metal etalon coating.

An enhancing stack 235 is then formed and coupled to the metal etalon coating. In one embodiment enhancing stack 235 is formed of a silicon dioxide layer approximately 93.5 nm thick, and a silicon nitride layer approximately 68 µm thick. The silicon dioxide layer has a relatively low index of refraction, approximately 1.47 in one embodiment, while the silicon nitride layer has a relatively high index of refraction, approximately 2 in one embodiment, compared to the first material.

A wide index of refraction ratio is desired in one embodiment. While silicon nitride, SiN, and silicon dioxide, SiO2 have such a ratio, silicon carbide may also be used. There are many possible combinations for such a high-low stack material. One function of the high-low layers is to obtain a desired phase shift between the layers to work out for peak reflection.

A spacer 240 is then formed of silicon dioxide in one embodiment, and provides a desired spacing between the first aluminum reflective layer 230 and a second aluminum reflective layer 245 that is formed supported by the spacer 240. In one embodiment, the spacer 240 is approximately 150 nm thick, and the second aluminum reflective layer 245 is approximately 10 nm thick. Again, an aluminum oxide layer, also represented at 245 may form on the layer 245 to approximately 3 nm thickness.

A second enhancing stack 250 is then formed supported by the reflective layer 245 in one embodiment. The enhancing stack 250 may be formed with a 60 nm thick layer of silicon dioxide and an approximately 38 nm layer of silicon nitride. Both enhancing stacks 235 and 250 provide a high-low index combination that enhances the light reflecting properties of the respective aluminum reflective layers 230 and 245. The thicknesses described in such layers may be varied significantly in different embodiments to provide desired reflectivities and frequency responses of the etalon 205.

A further silicon oxide layer 255 may be formed over the etalon 205, providing another optical surface. In one embodiment, a dark layer or light blocking layer 260 is formed with an opening over selected portions of the etalon 205 and sensor 215 to selectively allow light to pass through the etalon 205 and be received by the sensor 215. In one embodiment, the light blocking layer 260 is a highly absorbing film stack, and may include one or more metal films and oxides. Tantalum and Aluminum may be included in such films in one embodiment. A final layer of oxide 265 may be formed over the light blocking layer 260. Oxide 265 may have a thickness that is adjustable to provide a general transmission height leveling for etalons, such as for equalizing power for a given light source.

Light blocking trenches 270 and 275 may be formed supported by the substrate 210 and laterally spaced from and on opposite sides of the etalon 205 and sensor 215. It should be noted that the etalon 205 includes a portion that is substantially parallel to the substrate 210. This is the functioning area of the etalon 205. Sides of the etalon 205 appear to move generally away from the substrate outside the functioning area due in one embodiment to process deposition and etching steps for formation of the sensor 215 and/or other features supported by the substrate 210. The light blocking layer 260 generally operates to minimize light outside of the functioning area of etalon 205. In some embodiments, etalon coatings comprise aluminum and aluminum oxide.

Figure 3:
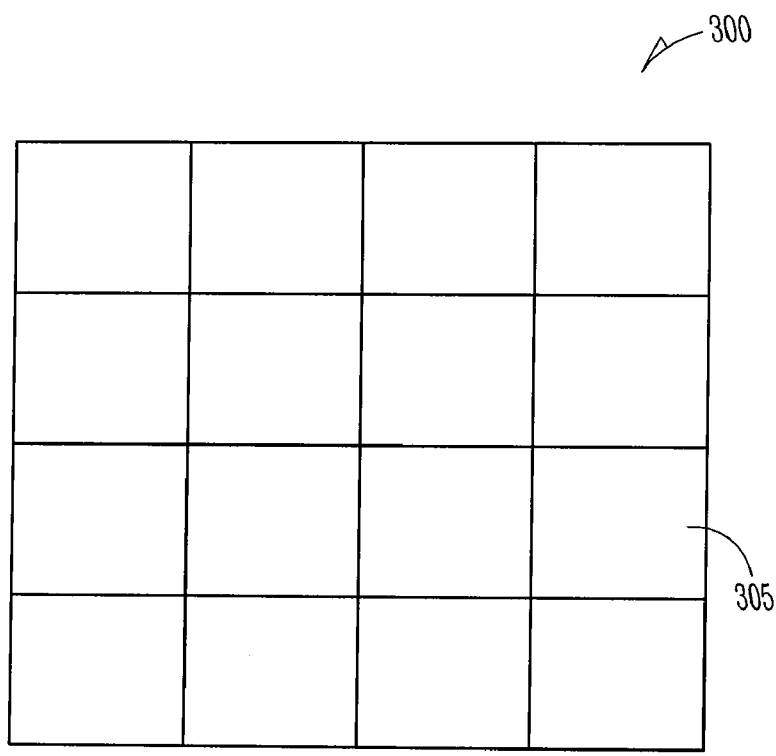
FIG. 3 is a block representation of an array of color sensors including etalons according to an example embodiment.

In various embodiments, multiple such sensor and etalon combinations may be formed in an array 300 in FIG. 3, supported by a substrate to form an image sensor. Various such sensor and etalon combinations 305 may be modified to sense different colors as desired. Electrical connections may be made to communicate sensed images to processing circuitry formed on the same or a different substrate. The wavelengths of light sensed by such combinations may be varied from 400 nm to 700 nm in one embodiment, and between 380 nm and 720 nm in a further embodiment. In one embodiment, a combination of sixteen sensor and etalons 305 may be used to sense sixteen different colors with tight finesse. The thickness of spacer 240 may be modified to shift the frequency response of the etalon in one embodiment.

The Abstract is provided to comply with 37 C.F.R. § 1.72 (b) to allow the reader to quickly ascertain the nature and gist of the technical disclosure. The Abstract is submitted with the understanding that it will not be used to interpret or limit the scope or meaning of the claims.

The invention claimed is:

1. A device comprising:
    a pair of two partially transmitting optical surfaces positioned approximately parallel to each other and spaced apart;
    a high reflectance metal etalon coating on each of the optical surfaces;
    an enhancing stack coupled to the metal etalon coating on each of the optical surfaces.

2. The device of claim 1 wherein the metal etalon coatings comprise aluminum.

3. The device of claim 1 wherein the metal etalon coatings further comprise aluminum oxide.

4. The device of claim 1 wherein the enhancing stack comprises silicon nitride and silicon dioxide.

5. The device of claim 1 and further comprising a spacing layer between the pair of optical surfaces and coatings.

6. The device of claim 5 wherein the spacing layer comprises silicon dioxide.

7. The device of claim 5 wherein the spacing layer defines a distance between the pair of optical surfaces that affects a free spectral range of the etalon.

8. The device of claim 1 wherein a first optical surface is positioned to receive light incident on the device, followed by an enhancing stack, followed by an etalon coating, followed by a spacing layer, followed by an enhancing stack, followed by an etalon coating and finally a second optical surface, wherein the second optical surface comprises layers for enhancing a blue region of net light transmission.

9. The device of claim 1 and further comprising a top oxide layer having thickness adaptable to equalize power for a given light source.

10. A sensor comprising:
    a photodiode;
    an etalon positioned between the photodiode and a light source, the etalon comprising:
        a pair of two partially transmitting optical surfaces positioned approximately parallel to each other and spaced apart;
        a high reflectance metal etalon coating on each of the optical surfaces;
        an enhancing stack coupled to the metal etalon coating on each of the optical surfaces; and
    a light blocking layer positioned between the etalon and light source for defining an area of the etalon and photodiode that can directly receive light from the light source.

11. The sensor of claim 10 and further comprising a pair of light blocking trenches disposed laterally on opposite sides of the photodiode.

12. The sensor of claim 10 wherein the metal etalon coatings comprise aluminum and aluminum oxide.

13. The sensor of claim 10 wherein the enhancing stack comprises silicon nitride and silicon dioxide.

14. The sensor of claim 10 and further comprising a spacing layer between the pair of optical surfaces and coatings, and wherein the spacing layer comprises silicon dioxide.

15. The sensor of claim 14 wherein a first optical surface is positioned to receive light incident on the device, followed by an enhancing stack, followed by an etalon coating, followed by the spacing layer, followed by an enhancing stack, followed by an etalon coating and finally a second optical surface.

16. A method comprising:
    forming a light sensing device on a substrate;
    forming a first optical surface supported adjacent the light sensing device;
    forming a first aluminum reflective layer supported by the first optical surface;
    forming a first enhancement stack supported by the first aluminum reflective layer;

forming a spacer supported by the first aluminum reflective layer;

forming a second aluminum reflective layer supported by the spacer and substantially parallel to the first aluminum reflective layer;

forming a second enhancement stack supported by the spacer; and forming a second optical surface supported by the second reflective layer.

17. The method of claim 16 wherein the first enhancement stack is formed with a first material having a relatively high index of refraction followed by a second material having a relatively low index of refraction compared to the first material.

18. The method of claim 17 wherein the first material is silicon, and wherein the second material is silicon nitride.

19. The method of claim 18 wherein the second enhancement stack is formed with silicon followed by silicon nitride layer.

20. The method of claim 16 and further comprising forming a light blocking layer supported by the second optical surface.

* * * * *